(12) United States Patent
Babala et al.

(10) Patent No.: US 6,374,679 B1
(45) Date of Patent: Apr. 23, 2002

(54) PRESSURE SENSOR INTEGRATED INTO AN ELECTRO-HYDRAULIC CONTROL UNIT

(75) Inventors: Michael L. Babala, Plymouth; Marc Bolitho, Linden; Paul M. Schliebe, Dexter, all of MI (US); Thomas Baron, Leimbach; Helmut Gegalski, Mülheim-Kärlich, both of (DE)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/473,236

(22) Filed: Dec. 27, 1999

Related U.S. Application Data

(60) Provisional application No. 60/113,984, filed on Dec. 28, 1998, and provisional application No. 60/115,341, filed on Jan. 11, 1999.

(30) Foreign Application Priority Data

Apr. 9, 1999 (DE) .......................................... 199 16 087

(51) Int. Cl.$^7$ ................................................. G01L 7/08
(52) U.S. Cl. ......................................................... 73/715
(58) Field of Search ........................... 73/715, 116, 717, 73/118, 119, 756

(56) References Cited

U.S. PATENT DOCUMENTS

| | | | |
|---|---|---|---|
| 2,935,292 A | 5/1960 | Williamson | |
| 4,770,207 A | 9/1988 | Hofmann | |
| 4,928,530 A | 5/1990 | Lehto et al. | |
| 4,937,553 A | 6/1990 | Juckenack | |
| 5,060,108 A | * 10/1991 | Baker et al. | ............. 361/283.4 |
| 5,324,101 A | 6/1994 | Kehl et al. | |
| 5,329,819 A | * 7/1994 | Park et al. | ..................... 73/724 |
| 5,402,824 A | 4/1995 | Hosoya et al. | |
| 5,511,864 A | 4/1996 | Reinartz et al. | |
| 5,656,780 A | * 8/1997 | Park | ............................ 73/724 |
| 5,869,766 A | * 2/1999 | Cucci et al. | .................. 73/706 |
| 6,007,162 A | * 12/1999 | Hinz et al. | ............... 303/119.3 |
| 6,186,009 B1 | * 2/2001 | Miyano et al. | ................ 73/756 |
| 6,209,399 B1 | * 4/2001 | Probst et al. | ................. 73/756 |

FOREIGN PATENT DOCUMENTS

| | | |
|---|---|---|
| DE | 195 45 091 A1 | 6/1997 |
| DE | 196 16 658 A1 | 9/1997 |
| EP | 0 570 624 A2 | 11/1993 |
| EP | 0 816 142 A1 | 1/1998 |
| WO | WO 96/33081 | 10/1996 |
| WO | WO 00/30909 | 6/2000 |

* cited by examiner

Primary Examiner—Benjamin R. Fuller
Assistant Examiner—Andre Allen
(74) Attorney, Agent, or Firm—MacMillan, Sobanski & Todd, LLC

(57) ABSTRACT

A pressure sensor is mounted integrally in a hydraulic valve body. The sensor has a base which extends into a bore formed in the valve body. The valve body bore is in communication with a pressurized hydraulic fluid. A first circumferential groove formed in the sensor base carries an O-ring which forms a seal between the sensor and the wall of the valve body bore. A second circumferential groove formed in the sensor base carries a spring ring which extends into a corresponding groove formed in the wall of the valve body groove. The spring ring cooperates with the sensor base and valve body bore grooves to retain the sensor in the valve body bore.

23 Claims, 7 Drawing Sheets

PRESSURE SENSOR INTEGRATED INTO AN ELECTRO-HYDRAULIC CONTROL UNIT

CROSS REFERENCE TO RELATED APPLICATIONS

This application claims the benefit of U.S. Provisional Application Nos. 60/113,984, filed Dec. 28, 1998, and 60/115,341 filed on Jan. 11, 1999 and German Patent Application No. 199 16 087.2 filed on Apr. 9, 1999.

BACKGROUND OF THE INVENTION

This invention relates in general to pressure sensors and in particular to a pressure sensor which is integrated into an electro-hydraulic control unit for an antilock brake system.

An anti-lock brake system (ABS) is often included as standard equipment on new vehicles. When actuated the ABS is operative to control the operation of some or all of the vehicle wheel brakes. A typical ABS, which controls all four vehicle wheels, includes a plurality of normally open and normally closed solenoid valves which are mounted within a control valve body and connected to the vehicle hydraulic brake system. A separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

It is also known to provide an ABS for the rear wheels only. Such a system is commonly referred to as a rear wheel anti-lock brake system (RWAL). Typically, RWAL does not include a motor driver pump, but utilizes the vehicle master brake cylinder as a source of pressurized brake fluid. While RWAL has a limited volume of pressurized brake fluid available during an ABS braking cycle, elimination of the pump and pump motor simplifies the system while reducing the cost thereof.

Both four wheel ABS and two wheel RWAL include an electronic control module which has a microprocessor. The control module is electrically coupled to the pump motor, for a four wheel ABS. The control module also is connected to a plurality of solenoid coils associated with the solenoid valves and one or more wheel speed sensors for monitoring the speed and deceleration of the controlled wheels. The control module also is electrically coupled to a pressure sensor which monitors the pressure generated by the vehicle master cylinder. The control module is typically mounted within a removable housing which is attached to the control valve body to form a compact unit which is often referred to as an ABS Electro-hydraulic Control Unit (ECU).

It is known to mount the coils for actuating the solenoid coils within the control module housing. Tubular sleeves which enclose the valve armatures extend from the valve body, forming a seal for the hydraulic brake circuit. When the control module housing is mounted upon the valve body, each of sleeves is received by an associated solenoid coil. Accordingly, the housing can be removed from the valve body for servicing of the control module electronics without opening the hydraulic brake circuit.

During vehicle operation, the microprocessor in the ABS control module continuously receives speed signals from the wheel speed sensors and pressure signals from the pressure sensor. The microprocessor monitors the wheel speed signals and pressure signals for potential wheel lock-up conditions. When the vehicle brakes are applied and the microprocessor senses an impending wheel lock-up condition, the microprocessor is operative to actuate the pump motor, in a four wheel ABS. The microprocessor also is operable to selectively operate the solenoid valves in the valve body to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

SUMMARY OF THE INVENTION

This invention relates to an improved pressure sensor which is integrated into an electro-hydraulic control unit for an anti-lock brake system.

Typically, prior art pressure sensors used in Anti-lock Brake Systems (ABS) are threaded into either a port in the vehicle master cylinder or an external surface of the electro-hydraulic control valve. The external pressure sensor location exposes the sensor to the under-hood operating environment of the vehicle and requires that the sensor be hermetically sealed. Installing a threaded pressure sensor is labor intensive and has a potential for introducing contaminants into the brake fluid. Such pressure sensors also require a dedicated wiring harness which requires an additional manufacturing process step of connecting the harness end to the sensor. Accordingly, it would be desirable to provide an alternate sensor design which eliminates these difficulties.

The present invention contemplates a pressure sensor for a hydraulic control system having a cylindrical base portion which includes a circumferential groove formed therein. The base portion is adapted to be inserted into a bore formed in a hydraulic valve body for the hydraulic control system. A ring of resilient material is disposed within the circumferential groove, the resilient material being adapted to form a seal between the sensor base portion and a wall of the valve body bore. The pressure sensor also includes a pressure sensing device mounted upon the base portion. The base portion can further include a second circumferential groove which carries a spring ring. The spring ring is adapted to cooperate with a complementary groove formed in the valve body bore to retain the sensor in the valve body bore.

Alternately, the second circumferential groove can have a second ring of resilient material disposed therein which is also adapted to form a seal between the pressure sensor base portion and the valve body bore. When the sensor includes two sealing rings, a pressure sensing port is formed in the base portion and the sensed pressure is applied between the rings of resilient material, so that the axial pressures exerted upon the sensor are balanced. The pressure sensor can further include a third circumferential groove formed in the base portion which has a spring ring disposed therein. The spring ring is adapted to cooperate with a complementary groove formed in the valve body bore to retain the sensor in the valve body bore.

It is further contemplated that the pressure sensor includes an axial electrical connector mounted upon the base portion. The connector can include a plurality of electrical connectors. The sensor also includes axial bore formed in the base portion. The axial bore terminates in a diaphragm which carries the pressure sensing device and the bore is adapted to receive pressurized hydraulic fluid. The sensor can further include a cylindrical insert disposed within the axial bore formed in the sensor base portion.

In the preferred embodiment, the pressure sensor is mounted in a hydraulic control system valve body adjacent to a plurality of solenoid valves and enclosed by a removable housing which also carries solenoid coils for the solenoid valves. Also, the electrical connector is a male connector and the housing carries a female connector which cooperates with the male connector to form an electrical connection for the pressure sensing device. The sensor base portion can be formed having a stepped exterior shape with the valve body bore also being stepped. The bore step cooperates with the sensor base portion step to limit the insertion distance of the sensor into the valve body bore.

It is also contemplated that the pressure sensor includes a signal conditioning circuit carried by the sensor base portion. The signal conditioning circuit performs diagnostic tests upon the pressure sensing device and, upon detecting a non-operable pressure sensor, generates an error signal. The diagnostic test can be performed upon initial power up of the sensor and/or during operation of the sensor. In the preferred embodiment, the signal conditioning circuit is connected to a microprocessor included in an anti-lock brake system, the signal conditioning circuit being responsive to a signal from the microprocessor to transmit pressure data to the microprocessor. The sensor also can include a temperature sensor with the signal conditioning circuit being operable to transmit temperature data to the microprocessor.

In addition to being used in an anti-lock brake system, it is contemplated that the pressure sensor also can be used in a traction control system or in a vehicle stability system.

The invention also contemplates a method for installing a sensor into a hydraulic valve body. The method includes providing a pressure sensor having a cylindrical base portion which carries a spring ring in a first circumferential groove formed therein and a ring of resilient material carried in a second circumferential groove formed therein. The pressure sensor is partially inserted into a bore in a valve block for a hydraulic control system until the ring of resilient material forms a seal with the wall of the valve block bore. The pressure sensor is connected to pressure monitoring equipment and the valve block bore is pressurized. The monitoring equipment is observed to confirm operation of the pressure sensor. Finally, the pressure sensor is inserted fully into the valve block bore upon obtaining readings to indicate satisfactory operation of the pressure sensor with the spring ring engaging a circumferential groove formed in the wall of the valve body bore and cooperating therewith to retain the sensor within the valve body bore.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
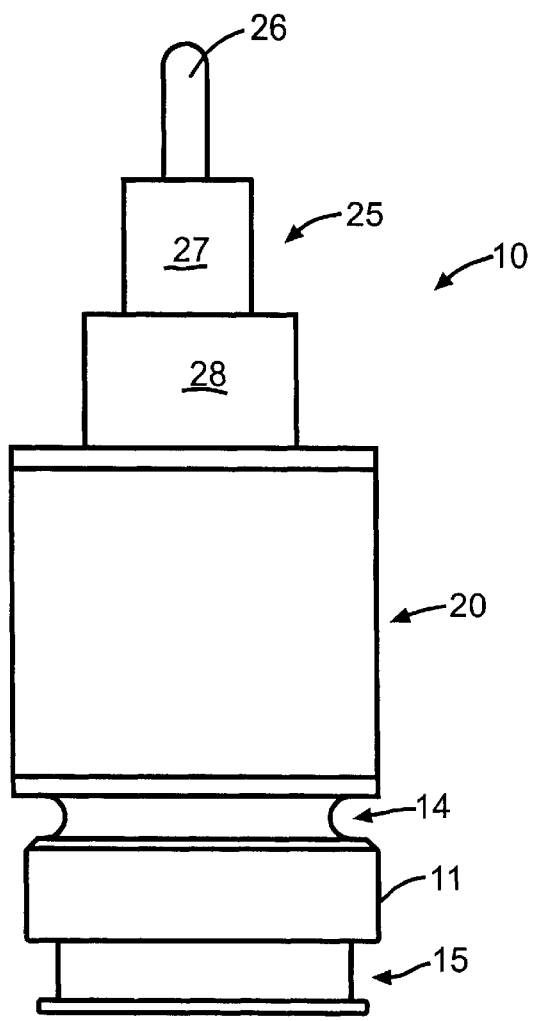
FIG. 1 illustrates a pressure sensor in accordance with the invention.
Figure 3:
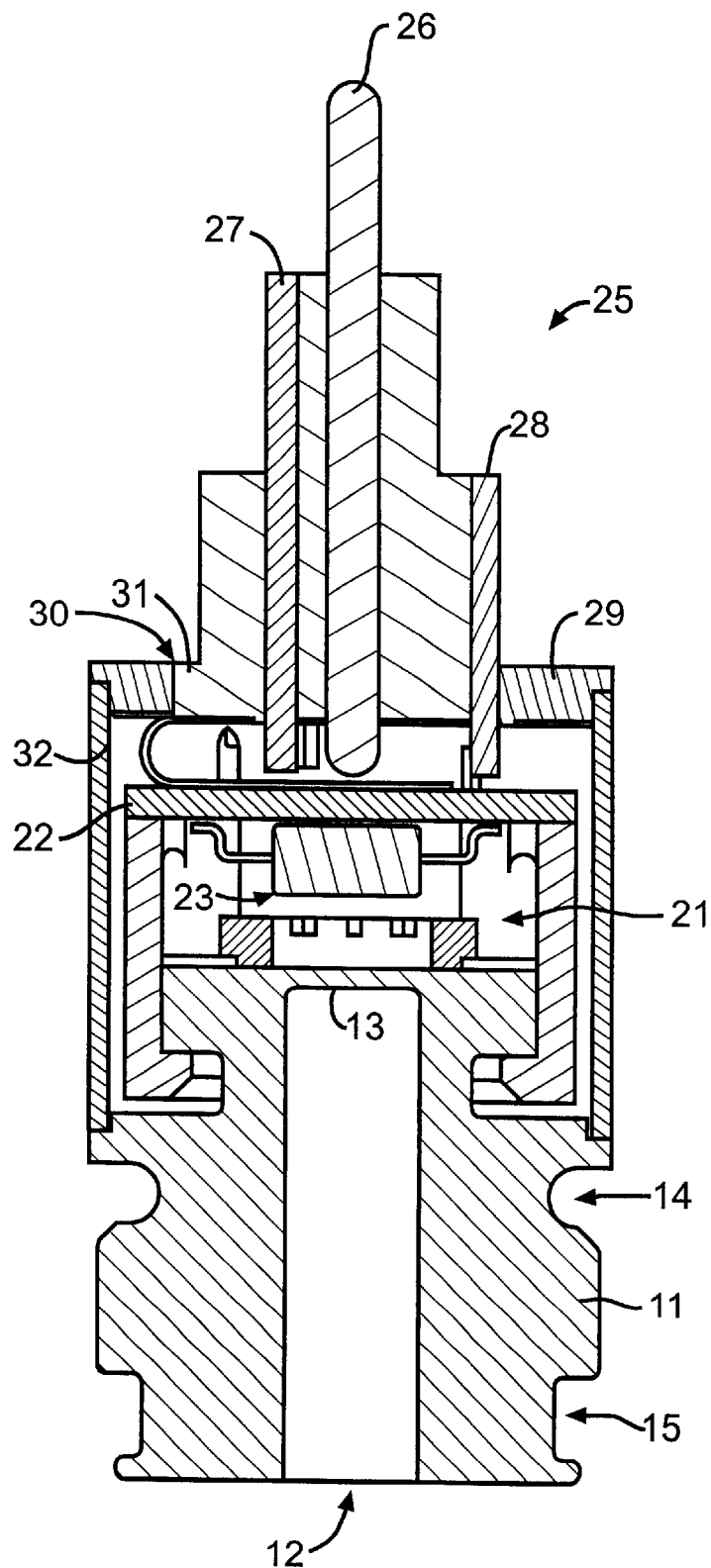
FIG. 3 is a sectional view of the pressure sensor shown in FIG. 1 taken along line 3—3 in FIG. 2

Referring now to the drawings, there is illustrated in FIG. 1 an pressure sensor 10 in accordance with the invention. The sensor 10 includes a generally cylindrical base 11 having a central axial bore 12 formed therein. As best seen in FIG. 3, the upper end of the bore 12 terminates in a diaphragm 13. The base 11 also has upper and lower circumferential grooves 14 and 15, respectively, formed therein. In the preferred embodiment, the base of the upper groove 14 has a semi-circular cross section.

The base 11 carries a central sensor portion 20 which, in the preferred embodiment, includes a strain gage type pressure sensing device 21 which uses resistive technology arranged in a full or half bridge configuration. The pressure sensing device 21 is mounted upon the upper surface of the diaphragm 13. As will be explained below, the bore 13 receives pressurized brake fluid which presses against the lower surface of the diaphragm 13. When the pressure within the bore 12 changes, strains are developed in the diaphragm 13 which are detected by the pressure sensing device 21 and converted thereby into an electrical pressure signal. The central portion 20 of the sensor 10 also includes a printed circuit board 22 which carries an electronic circuit 23 for conditioning the pressure signals generated by the pressure sensing device 21. While the preferred embodiment has been described and illustrated as having a resistive strain gage type of pressure sensing device 21, it will be appreciated that the invention also can be practiced with other types of pressure sensing devices, such as, for example, a capacitive type of pressure sensor (not shown).

The pressure sensor 10 further includes a male axial connector 25 which extends from the top of the central sensor portion 20. As best seen in FIG. 3, the connector 25 includes an axially extending central electrode 26 and first and second circular electrodes 27 and 28, respectively, which are concentric with the central electrode 26. The electrodes 26, 27 and 28 are separated by insulative material and extend through a sensor cap 29. The lower ends of the electrodes 26, 17 and 28 are connected to the electrical components 23 of the pressure sensing device 21. In the preferred embodiment, the central electrode 26 is connected to a five volt source which supplies power to the pressure sensing device 21 and the signal conditioning circuit 23. The first circular electrode 27 carries the pressure sensor output signal while the second circular electrode 28 is a ground connection.

Figure 2:
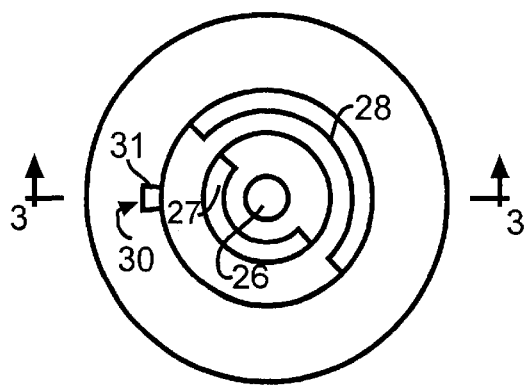
FIG. 2 is a plan view of the pressure sensor shown in FIG. 1

Also in the preferred embodiment, a keyway 30 is formed in the cap 29 which receives a complementary key 31 formed upon an outer surface of the male connector 25, as shown in FIGS. 2 and 3. The key 31 cooperates with the keyway 30 to prevent rotation of the male connector 25 relative to the cap 29. Alternately, the invention can be practiced without the keyway 30 and key 31. The connector 25 and sensor cap 29 are supported upon the sensor base 11 by a cylindrical sleeve 32.

While three electrodes 26, 27 and 28 are shown in FIGS. 2 and 3, it will be appreciated that the invention also can be practiced with more or less electrodes. The male connector 25 is received by a complementary female connector (not shown) to electrically couple the sensor 10 to the ABS electronic control module. The axial symmetry of the connector 25 eliminates the need to orient the connector components relative to one another and thereby simplifies the manufacturing process.

Figure 4:
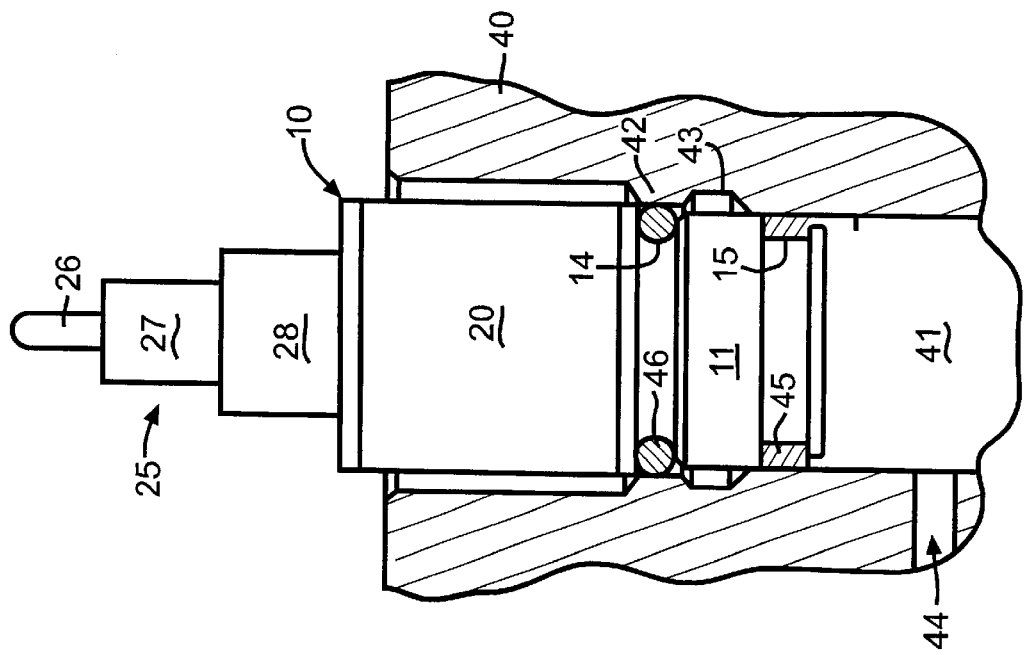
FIG. 4 illustrates the pressure sensor shown in FIG. 1 mounted in a hydraulic control unit.

The invention further contemplates that the sensor 10 is permanently mounted upon a hydraulic control valve body 40, as illustrated in FIG. 4. The sensor 10 is received by a pressure sensor bore 41 formed in the valve body 40. The upper portion of the pressure sensor bore 41 includes a reduced diameter portion 42 having chamfered edges. The purpose for the reduced diameter portion 42 will be described below. The lower edge of the reduced diameter portion 42 defines a circumferential retaining groove 43. An internal passageway 44 formed in the valve body 40 provides communication between the valve body bore 41 and the master cylinder supply portion of the valve body 40 (not shown).

An O-ring 45 formed from a resilient material is disposed in the lower groove 15 formed in the base 11 of the sensor 10. The O-ring 45 is compressed between the wall of the valve body bore 41 and the lower sensor groove 14 to form a seal therebetween.

A circular spring ring 46 carried by the upper groove 14 formed in the base 11 of the sensor 10 retains the sensor 10 in the valve body bore 41. As shown in FIG. 4, the spring ring 46 extends into the circumferential retaining groove 43 formed in the wall of the pressure sensor bore 41. Upon initial insertion of the pressure sensor 10 into the pressure sensor bore 41, the chamfered edge of the reduced diameter portion 42 of the bore 41 cooperates with the spring ring 46 to compress the ring 46. Upon further insertion of the sensor 10, the ring 46 expands in a radial direction into the retaining groove 43 to retain the sensor 10 within the bore 41.

In the preferred embodiment, the pressure sensor 10 is a non-serviceable part which is permanently fixed in the valve body 40. When installed, the sensor 10 is flush with the surface of the valve body 40 with only the electrical connector 25 extending above the valve body surface. Also in the preferred embodiment, the sensor is co-located with the solenoid valves. Accordingly, the complementary female connector is carried by the ABS electronic control module (not shown). As described above, the ABS electronic control module is mounted in a removable housing. Accordingly, an electrical connection with the sensor 10 is made when the control module housing is installed upon the valve body 40. This eliminates the separate wiring harness required by prior art pressure sensors. Furthermore, the control module housing provides a hermetic seal for the pressure sensor 10, eliminating any need for a separate seal therefor.

Figure 5:
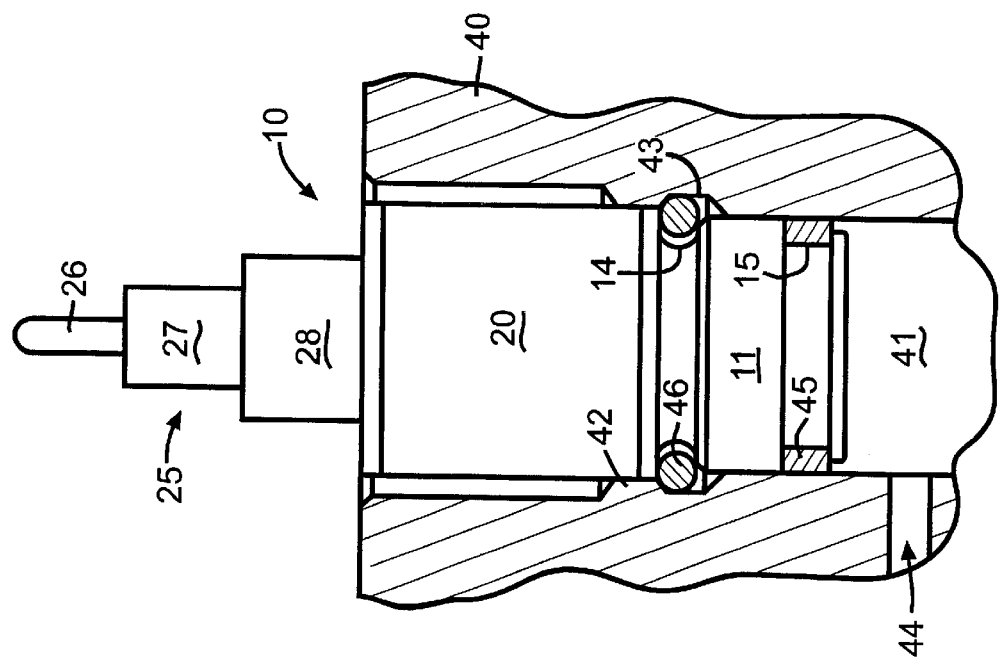
FIG. 5 illustrates the pressure sensor shown in FIG. 1 in a test position prior to being seated in a hydraulic control unit.

The invention further contemplates a test position for the sensor 10, which is illustrated in FIG. 5. Components shown in FIG. 5 which are similar to components shown in FIG. 4 have the same numerical designators. As shown in FIG. 5, the sensor 10 is partially inserted into the valve body bore 41. The O-ring 45 is compressed by the wall of the bore 41 to form a seal between the sensor 10 and the bore wall. Additionally, as described above, the spring ring 46 is compressed into the semicircular base of the upper groove 14 by the reduced diameter portion 42 of the bore 41 above the sensor retaining groove 43. The electrical connector 25 to connected to a test apparatus (not shown). This allows pressurization of the bore 41 and testing of the sensor 10 to confirm proper operation of the sensor 10. Upon successful completion of the test, the sensor 10 is pressed further into the bore 41 until the spring ring 46 seats in the retaining groove 43. Should the sensor 10 not pass the test, it may be withdrawn form the bore 41 since the spring ring 46 has not expanded into the retaining groove 43.

Figure 6:
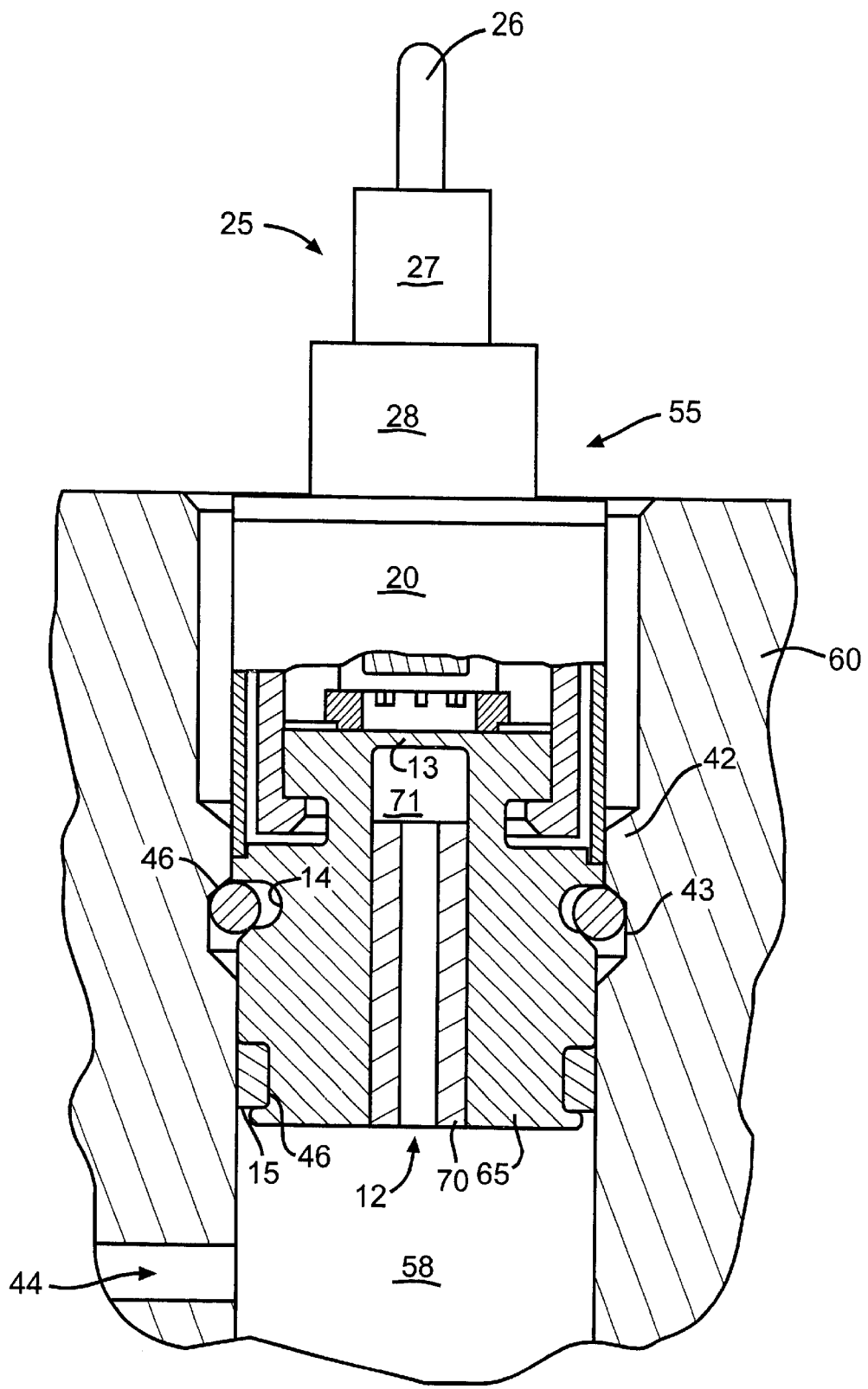
FIG. 6 is a partial sectional view of an alternate embodiment of the pressure sensor shown in FIG. 1.

A partial sectional view of an alternate embodiment of the pressure sensor is shown generally at 55 in FIG. 6. Components shown in FIG. 6 which are similar to components shown in FIGS. 3 and 4 have the same numerical designators. The pressure sensor 55 is carried in a stepped pressure sensor bore 58 formed in a valve body 60. Accordingly, the sensor 55 includes a stepped base 65. The stepped base 65 cooperates with the stepped bore 58 to axially position the sensor 55 within the bore. Also, a cylindrical insert 70 having an axial bore formed therethrough is disposed within the axial bore 12 formed in the sensor base 65. In the preferred embodiment, the insert 70 is formed from either steel or an elastomer; however, the insert 70 also can be formed from other materials. The length of the insert 70 is less than the depth of the bore 12. The insert 70 cooperates with the bore 12 to define a chamber 71 which is adjacent to the sensor diaphragm 13. The chamber 71 has the same diameter as the bore 12. Accordingly, the stepped bore 58 and insert 70 reduce the volume of the brake fluid supplied to the sensor 65 without diminishing the size of the sensor diaphragm 13.

Figure 7:
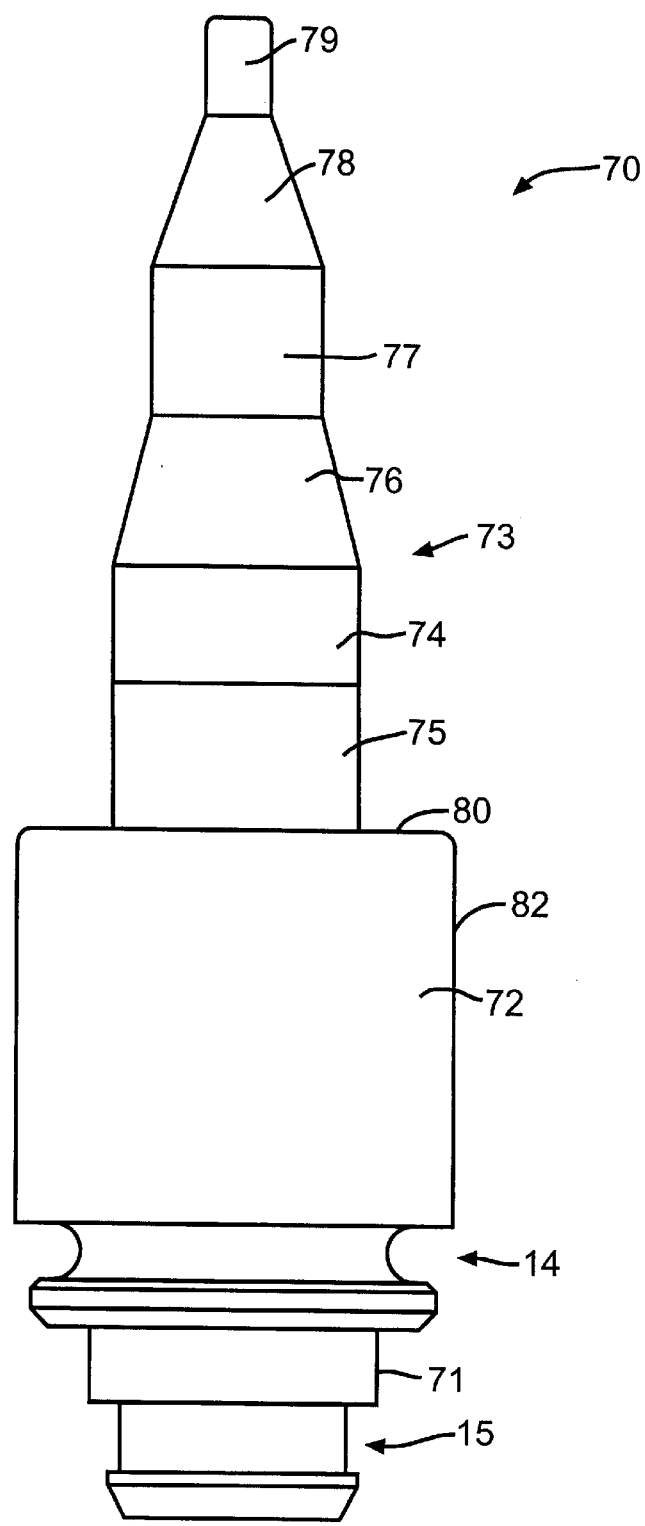
FIG. 7 illustrates another alternate embodiment of the pressure sensor shown in FIG. 1.

FIG. 7 illustrates another embodiment 70 of the pressure sensor. The pressure sensor 70 includes a stepped base 71 which is similar to the pressure sensor 55 shown in FIG. 6. Components shown in FIG. 7 which are similar to components shown in FIG. 6 have the same numerical identifiers. The base 71 includes an upper circumferential groove 14 which receives a retaining spring ring (not shown) and a lower circumferential groove 15 which receives an O-ring (not shown). Mounted upon the base 72 is the sensor portion 72. Extending axially from the top of the sensor portion is a male connector 73. The connector includes ground ring 74 formed from an electrically conductive material. The ground ring 74 is mounted upon a cylinder support 75 formed from an insulative material. The ground ring 74 is connected s internally to the signal conditioning circuit (not shown) contained within the sensor portion 72 of the sensor 70. A first tapered portion 76 of insulated material extends axially from the ground ring to a second ring 77 formed from an electrically conductive material. The second ring 77 is connected internally to the signal conditioning circuit and thus provides an output signal connection. A second tapered portion 78 extends axially from the second ring 77 to a cylindrical tip 79 formed from electrically conducting material. The tip 79 extends through the connector 73 and provides a connection between a power supply and the signal conditioning circuit.

In the preferred embodiment, a ground flange 80 is mounted upon the upper surface of the sensor portion 72. The sensor portion 72 includes a cylindrical metal housing 82 which has an upper end crimped onto the ground flange 80. The ground flange 80 is capacitively coupled (not shown) to the ground ring 74 to provide a ground for the sensor housing 82, while the coupling capacitor blocks noise from the signal conditioning circuit ground. Because the rings 74 and 77 extend completely around the connector 73, the orientation of the sensor 70 in the valve block is not important. The connector 73 is received by a corresponding female connector (not shown) having three electrical connectors. The female connector is mounted upon the electronic control module. The tapered portions 76 and 78 help guide the female connector over the male connector 73 when the electronic control module housing is assembled onto the valve body.

Figure 8:
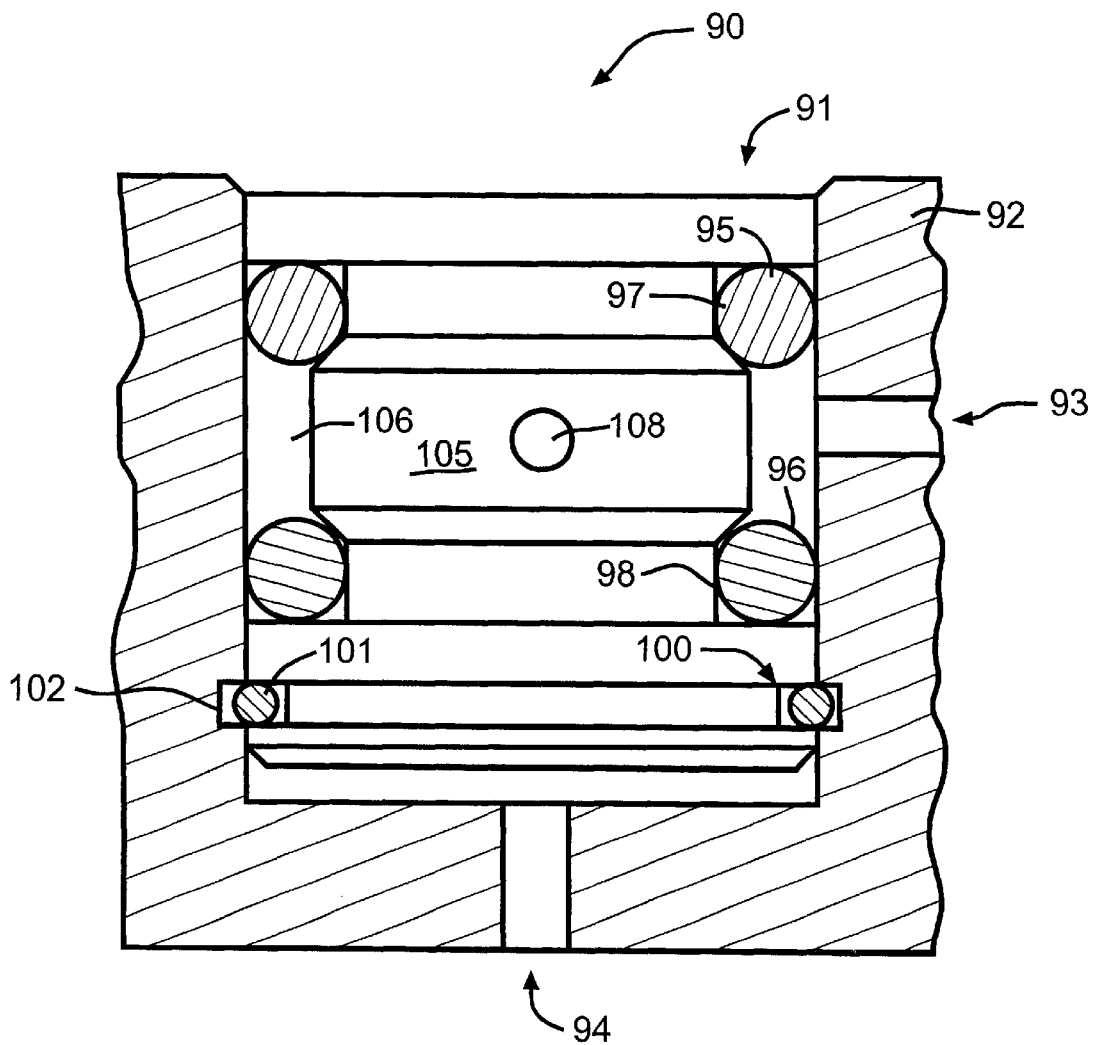
FIG. 8 illustrates another alternate embodiment of the pressure sensor shown in FIG. 1 mounted in a hydraulic control unit.

FIG. 8 illustrates another embodiment 90 of the pressure sensor. The sensor 90 is shown disposed in a bore 91 formed in a hydraulic valve body 92. A cross bore 93 provides communication between the bore 92 and the vehicle master cylinder (not shown). An axial bore 94 provides a vent for the lower end of the bore 91. The pressure sensor includes first and second O-rings, 95 and 96, respectfully, which are disposed in first and second circumferential grooves 97 and 98. A third circumferential groove 100 is formed in the lower end of the sensor 90. A retaining spring ring 101 is disposed in the third groove 100 and cooperates with a corresponding groove 102 formed in the wall of the bore 91 to retain the pressure sensor 90 within the bore 91. The sensor 90 also includes a reduced diameter center portion 105 which cooperates with the bore 91 to define a pressure chamber 106. The pressure chamber 106 receives brake fluid from the cross bore 93. The brake pressure exerts equal axial pressures upon the O-rings 95 and 96. Thus, the axial forces upon the sensor 90 are balanced. A port 108 formed in the center portion 105 of the pressure sensor receives pressurized brake fluid and communicates with a pressure sensing device (not shown) which is contained within the pressure sensor 90.

Figure 9:
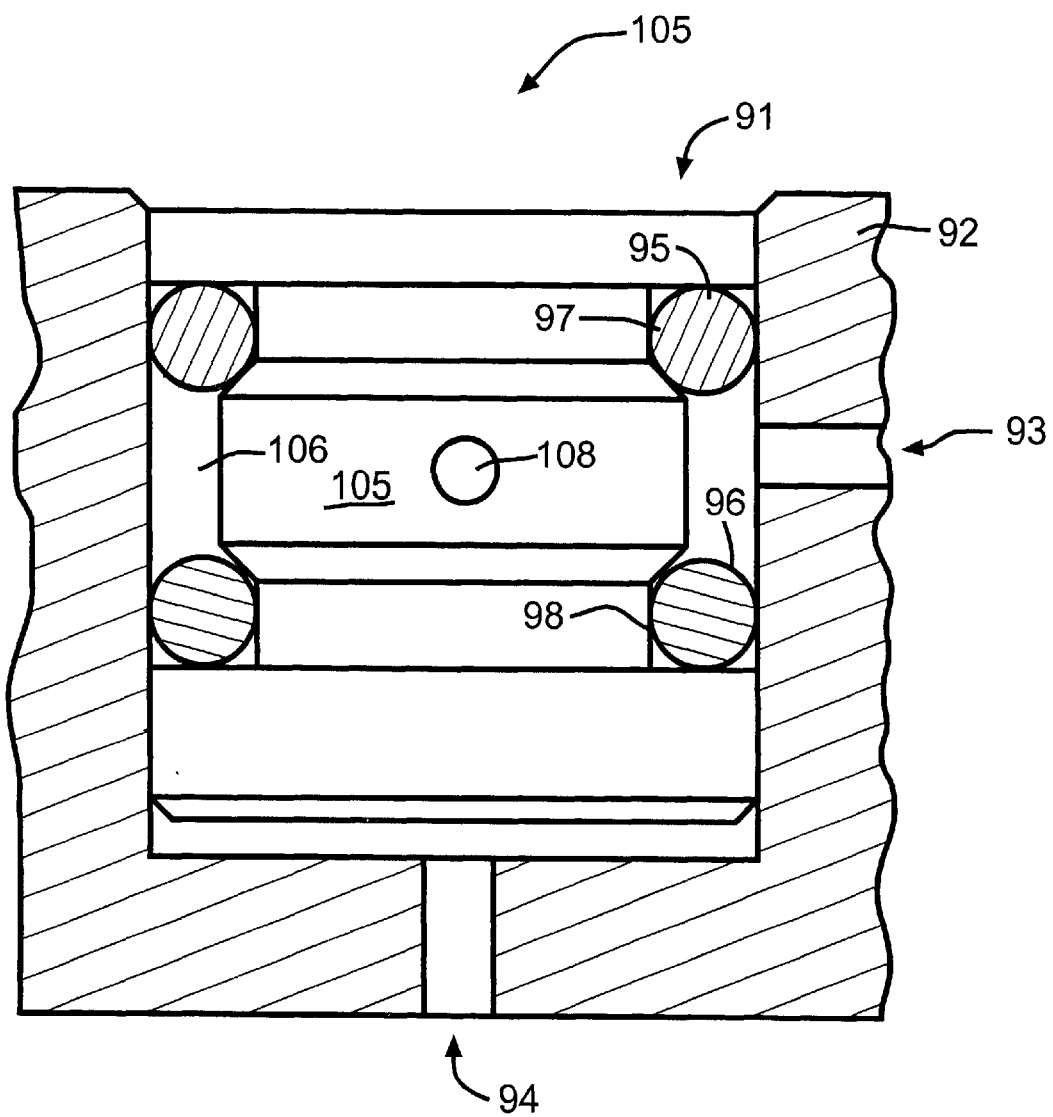
FIG. 9 illustrates an alternate embodiment of the pressure sensor shown in FIG. 8.

An alternate embodiment 105 of the pressure sensor 90 shown in FIG. 8 is illustrated in FIG. 9. Components shown in FIG. 9 which are similar to components in FIG. 8 have the same numerical designators. As described above, the axial forces exerted upon the sensor 105 are balanced. Therefore, the pressure sensor 105 does not include a spring retaining ring and the corresponding grooves to retain the sensor 105 within the bore 91 are not needed. Accordingly, the sensor 105 has a simpler structure and is less costly to manufacture that the sensor 90 described above.

The invention further contemplates that the signal conditioning circuit 23 can include an Application Specific Integrated Circuit (ASIC) which would provide a serial number output. In such a case, it is contemplated that the electrical connector would include a bi-directional output pin. Accordingly, the serial output would be requested by the electronic control unit microprocessor. The electronic control unit microprocessor also could provide continuous monitoring of the sensor for faults such as bridge stray resistance, bridge open circuited, bridge short circuited, and/or ASIC failure. Upon power up, the ASIC could also perform a self test to assure that the pressure sensor is operational. Should the sensor be non-operational, the ASIC would generate an error signal which would be transmitted to the microprocessor in the electronic control module. The microprocessor would be responsive to the error signal to disable the ABS and provide a warning signal to the vehicle operator, such as illuminating a warning light.

It also is contemplated that a temperature sensing device could be included in the sensor. The temperature sensing device would provide brake fluid temperature data to the microprocessor. The ASCI could provide both pressure and temperature data in a signal data output signal. For example, the ASCI could provide a pulse width modulated output signal with frequency corresponding to the temperature data and the duty cycle corresponding to the pressure data. Alternately, the ASCI could provide a pulse width modulated output signal with duty cycle corresponding to the temperature data and the frequency corresponding to the pressure data.

While the preferred embodiment of the invention has been illustrated and described for a pressure sensor utilized in an ABS, it will be appreciated the invention also can be practiced with other control systems. For example, it is contemplated that the invention also can be included in intelligent or integrated chassis control systems, such as Traction Control, Stability Control, Adaptive Cruise Control or Collision Avoidance Systems.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been described and illustrated as including a male electrical connector, it will be appreciated that the invention also can be practiced with a female connector.

What is claimed is:

1. A pressure sensor for a hydraulic control system that includes a hydraulic valve body having a bore formed therein, said pressure sensor comprising:

a cylindrical base portion having a circumferential groove formed therein, said base portion having a diameter corresponding to the size of the bore formed in the hydraulic body such that the base portion is insertable inserted into the bore;

a ring of resilient material disposed within said circumferential groove, said resilient material adapted to form a seal between said base portion and a wall of the bore formed in the hydraulic valve body; and a pressure sensing device mounted upon said base portion.

2. A sensor according to claim 1 wherein said circumferential groove is a first groove and said base portion has a second circumferential groove formed therein and further wherein the bore in the hydraulic valve body has a circular groove formed in the wall thereof that corresponds to said second circumferential groove formed in said sensor base portion, said second circumferential groove formed in said sensor base portion having a spring ring disposed therein, said spring ring cooperating with said complementary groove formed in said hydraulic valve body bore wall to retain said sensor base portion in said valve body bore.

3. A sensor according to claim 2 further including an axial electrical connector mounted upon said base portion.

4. A sensor according to claim 3 wherein said electrical connector includes a plurality of electrical connectors.

5. A sensor according to claim 3 wherein said sensor base portion has an axial bore formed therein and a diaphragm that extends across an end of said bore, said diaphragm carrying said pressure sensing device and further wherein said bore is adapted to receive pressurized hydraulic fluid.

6. A sensor according to claim 5 wherein the hydraulic valve body has a plurality of solenoid valves mounted thereon with the sensor being mounted in the hydraulic valve body adjacent to said plurality of solenoid valves and further wherein the sensor is enclosed by a removable housing, said housing forming a hermetic seal with said valve body, said housing also carrying solenoid coils for said solenoid valves.

7. A sensor according to claim 6 wherein said electrical connector is a male connector and said housing carries a female connector which cooperates with said male connector to form an electrical connection for said pressure sensing device.

8. A sensor according to claim 5 further including a cylindrical insert disposed within said axial bore formed in said sensor base portion, said insert having an axial bore formed therethrough.

9. A sensor according to claim 8 wherein said base portion has a stepped exterior shape and further wherein said valve body bore also is stepped with said valve body bore step cooperating with said sensor base portion step to define an insertion distance for the sensor base portion into said valve body bore.

10. A sensor according to claim 5 further including a signal conditioning circuit carried by said sensor base portion.

11. A sensor according to claim 10 wherein said signal conditioning circuit performs diagnostic tests upon said pressure sensing device and, upon detecting a non-operable pressure sensor, generates an error signal.

12. A sensor according to claim 11 wherein said diagnostic test is performed upon initial power up of the sensor.

13. A sensor according to claim 11 wherein said signal conditioning circuit is connected to a microprocessor included in a vehicle brake control system, said signal conditioning circuit being responsive to a signal from said microprocessor to transmit pressure data to said microprocessor.

14. A sensor according to claim 13 further including a temperature sensor, said signal conditioning circuit being operable to transmit temperature data to said microprocessor.

15. A sensor according to claim 14 wherein said data is transmitted with a pulse modulated wave with a frequency being a function of said temperature data and a duty cycle being a function of said pressure data.

16. A sensor according to claim 14 wherein said data is transmitted with a pulse modulated wave with a frequency being a function of said pressure data and a duty cycle being a function of said temperature data.

17. A sensor according to claim 1 wherein said circumferential groove is a first groove and said ring of resilient material is a first ring of resilient material and further wherein said sensor base portion has a second circumferential groove formed therein, said second circumferential groove having a second ring of resilient material disposed therein, said resilient material in said second ring also adapted to form a seal between said sensor base portion and the valve body bore, and further wherein the valve body has a fluid supply passageway formed therein which communicates with the valve body bore between said first and second resilient rings, said fluid supply passageway adapted to supply pressurized hydraulic fluid to said valve body bore whereby any axial pressures exerted upon the sensor are balanced.

18. A sensor according to claim 17 wherein said sensor base portion further includes a pressure sensing port formed therein between said rings of resilient material.

19. A pressure sensor according to claim 18 further including a third circumferential groove formed in said sensor base portion and further wherein the bore in the hydraulic valve body has a circular groove formed in the wall thereof that corresponds to said third circumferential groove formed in said sensor base portion, said third circumferential groove having a spring ring disposed therein, said spring ring adapted to cooperate with said complementary groove formed in said hydraulic valve body bore wall to retain said sensor in said valve body bore.

20. A pressure sensor according to claim 5 wherein the pressure sensor is included in a traction control system.

21. A pressure sensor according to claim 5 wherein the pressure sensor is included in a vehicle stability system.

22. A method for installing a pressure sensor into a hydraulic valve body comprising the steps of:
  (a) providing a pressure sensor having a cylindrical base portion which carries a spring ring in a first circumferential groove formed therein and a ring of resilient material carried in a second circumferential groove formed therein;
  (b) inserting the pressure sensor partially into a bore in a valve block for a hydraulic control system until the ring of resilient material forms a seal with a wall of the valve block bore;
  (c) connecting the pressure sensor to pressure monitoring equipment;
  (d) pressurizing the valve block bore;
  (e) observing the monitoring equipment to confirm operation of the pressure sensor; and
  (f) inserting the pressure sensor filly into the valve body bore upon obtaining readings to indicate satisfactory operation of the pressure sensor, the spring ring engaging a circumferential groove formed in the wall of the valve body bore and cooperating therewith to retain the sensor within the valve body bore.

23. A method according to claim 22 further including the steps of:
  (g) removing the monitoring equipment; and
  (h) attaching a housing to the valve body, said housing enclosing the pressure sensor and forming a hermetic seal with the valve body.

* * * * *

UNITED STATES PATENT AND TRADEMARK OFFICE
CERTIFICATE OF CORRECTION

PATENT NO. : 6,374,679 B1
DATED : April 23, 2002
INVENTOR(S) : Michael L. Babala et al.

It is certified that error appears in the above-identified patent and that said Letters Patent is hereby corrected as shown below:

Column 8,
Line 22, delete "inserted".

Column 10,
Line 33, delete "filly" and insert -- fully --.

Signed and Sealed this

Third Day of September, 2002

Attest:

Attesting Officer

JAMES E. ROGAN
Director of the United States Patent and Trademark Office